Oct. 22, 1940.                J. C. CROWLEY                2,218,639
                               AIR BAG STEM
                             Filed July 9, 1938
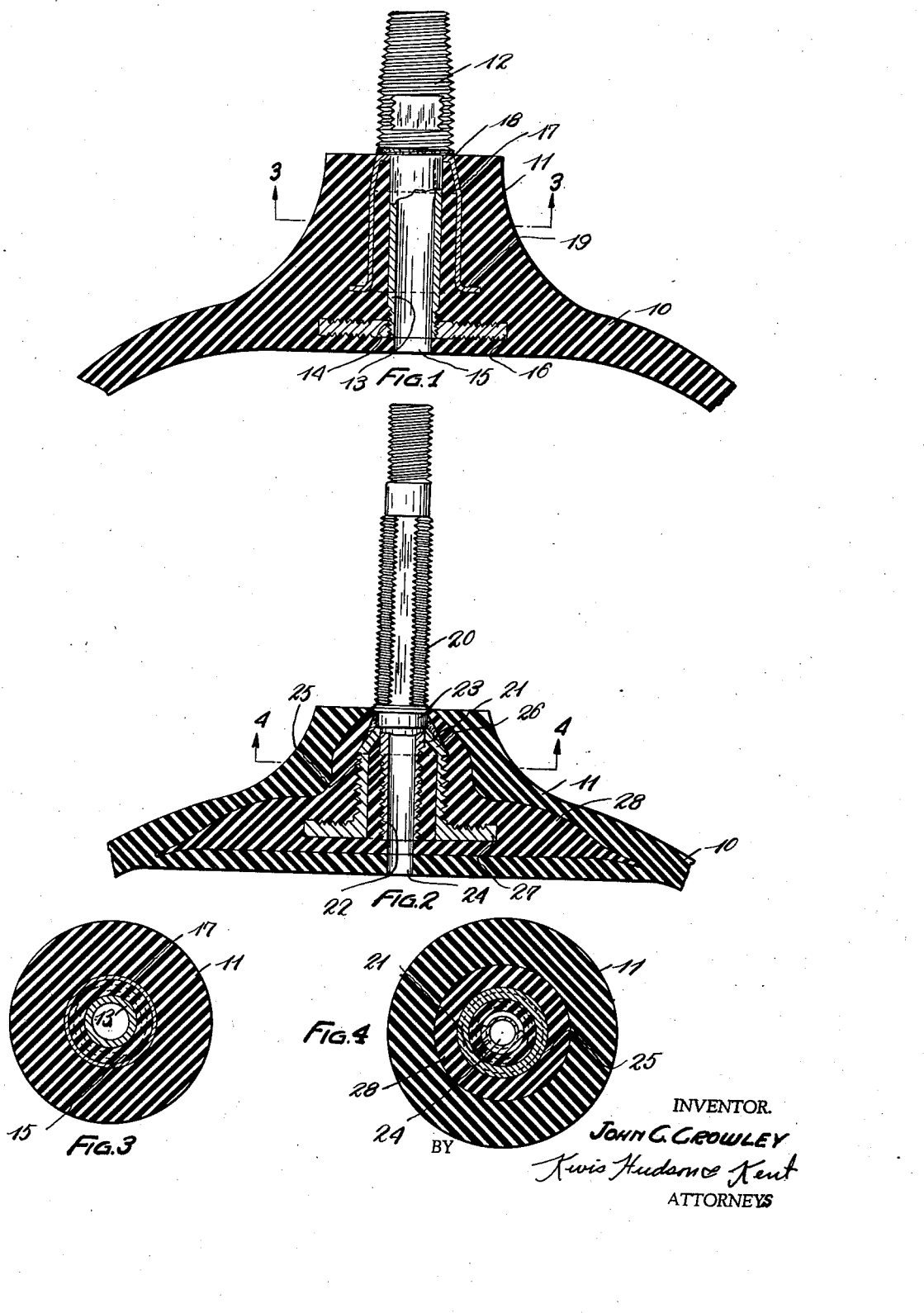

Patented Oct. 22, 1940

2,218,639

UNITED STATES PATENT OFFICE 2,218,639

AIR BAG STEM

John C. Crowley, Cleveland Heights, Ohio, assignor to The Dill Manufacturing Company, Cleveland, Ohio, a corporation of Ohio Application July 9, 1938, Serial No. 218,459

5 Claims. (Cl. 18—45)

This invention relates to a stem for an air bag, such as is employed in vulcanizing rubber tire casings and other inflatable articles.

The manner in which air bags are used in the vulcanization of tire casings is well understood in the art and need not be explained in detail herein, it being sufficient to say that when the molds containing the tire casings are arranged in a vulcanizer the air bags are located within the tire casings and are inflated, usually by high temperature steam, during the process of curing the tire casings.

Ordinarily the stems of air bags of this character are in the form of elongated metal stems having bores extending therethrough and provided at their inner ends with bases generally of oval or circular formation. The stems are molded into the bags or they have rubber molded around them and then this rubber with the stems therein is molded into the air bags.

In the use of an air bag equipped with the ordinary or conventional stem and when steam is used to inflate the air bag during the curing of the tire casing, heat is transferred through the metal stem to the rubber of the bag in which the stem is vulcanized, and results in a rapid deterioration of the rubber with consequent leaks occurring between the outside of the stem and the rubber of the air bag.

The object of the present invention is to provide a stem for an air bag which is so constructed as to substantially reduce the deterioration of the rubber of the bag in which the stem is molded.

A further object is to provide a stem for an air bag which is so constructed as to have a maximum surface for bonding the rubber of the bag to the stem and also which is so constructed that a minimum amount of heat is transmitted to the rubber of the bag adjacent to the stem when high temperature steam is being passed through the stem during the curing of the tire casing.

A further object is to provide an air bag and stem assembly such that the number of cures which can be made with the bag will be materially increased.

Further and additional objects and advantages not hereinbefore referred to will become apparent hereinafter during the following detailed description of embodiments of the invention which are illustrated in the accompanying drawing and wherein, Fig. 1 is a fragmentary sectional view of an air bag having mounted therein one form of stem embodying the invention, the stem being shown partly in elevation and partly in section.

Fig. 2 is a view similar to Fig. 1 but illustrating a different form of the invention.

Fig. 3 is a sectional view taken substantially on line 3—3 of Fig. 1 looking in the direction of the arrows, and Fig. 4 is a sectional view taken substantially on line 4—4 of Fig. 2 looking in the direction of the arrows.

A portion of a rubber air bag shown in section in Fig. 1 is indicated at 10 and this bag is provided with a thickened boss-like part 11 in which the bag stem is vulcanized. The stem shown in Figs. 1 and 3 is formed of metal and has an externally threaded outer end 12 located exteriorly of the air bag and a reduced inner end portion 13 that is molded in the rubber of the air bag and is provided at its inner end with exterior threads 14. The portions 12 and 13 of the stem are provided with a continuous bore 15 therethrough and by means of which high temperature steam can be introduced into the air bag during the curing of the tire casing.

A base member 16 which may be of any desired configuration and which is provided with a central threaded opening is screwed upon the threaded inner end of the portion 13 of the stem and is molded into the rubber of the air bag when the stem is molded therein.

A hollow metal shell 17 is associated with the stem and molded into the rubber of the air bag. The hollow metal shell in this instance is preferably of relatively thin gauge metal and is provided at its upper or outer end with an inturned flange 18 contacting the inner end of the exteriorly threaded portion 12 and also the exterior surface of the reduced portion 13 of the stem. The hollow metal shell 17, due to the inwardly extending flange 18 and to the configuration of the shell, is spaced from the reduced portion 13 of the stem and this shell is preferably permanently attached to the stem and is provided at its lower or inner end with an outwardly extending flange 19. The shell 17 is insulated from the portion 13 of the stem by the rubber of the air bag located between the shell and the stem, as clearly shown in Fig. 1.

The stem consisting of the portions 12 and 13, base 16 and shell 17 constitutes a unit such that the portion 13 of the stem together with the base 16 and shell 17 can be molded into the rubber of the air bag.

It will be seen that an improved bond can be obtained between the stem and the rubber of the air bag, since the outside and inside surfaces of the shell 17 and the surfaces of the flanges 18 and 19 provide additional vulcanizing areas.

Also it will be noted, as referred to previously, that the shell 17 is insulated from the portion 13 of the stem by the rubber lying between the shell and the portion 13 and thus the shell 17 and the rubber bonded thereto are protected from the heat transferred through the wall of the portion 13 of the stem, with the result that the bond between the rubber of the air bag and the vulcanizing areas of the shell 17 is not destroyed because of excessive heat.

An air bag provided with a stem structure of the character explained can be used for a greater number of curing operations than could an air bag provided with the conventional stem, since the bond between the rubber of the bag and the vulcanizing areas of the stem, base and shell is not readily destroyed because of excessive heat, and consequently leaks do not occur as readily as is the case with air bags employing the usual type of stems.

In Figs. 3 and 4 of the drawing there is illustrated a somewhat modified form of stem embodying the invention. The stem shown in these figures is longer than the stem shown in Figs. 1 and 2 and is provided with a portion indicated by the numeral 20, which is located exteriorly of the air bag and is externally threaded, and with a reduced portion 21 located within the rubber of the air bag, and also externally threaded, as indicated at 22, to provide surfaces which will interlock with the rubber of the bag when the stem is vulcanized therein. Intermediate the portions 20 and 21 of the stem is an annular shoulder portion 23 which, when the stem is mounted in the air bag, is likewise molded into the rubber of the bag. The entire stem is provided with a bore 24 extending therethrough.

In this form of the invention the stem instead of having a separate base and shell member is provided with a single member for performing the functions of the base and shell member. In this instance the single member referred to is of general circular configuration and is exteriorly threaded, as indicated at 25, to provide surfaces for interlocking with the rubber of the bag, it being noted that the upper end of the member is of inwardly tapered or conical formation as indicated at 26. The conical or tapered upper end 26 of the member contacts the shoulder 23 and the portion 21 of the stem and is preferably permanently connected to the stem by suitable means. It will also be noted that the member is of such size, with respect to the portion 21 of the stem, that its interior wall surface is spaced outwardly of the outer surface of the portion 21 of the stem, wherefore the rubber of the bag will extend between the member and the portion 21 of the stem.

The inner end of the threaded portion 25 of the member is provided with an outwardly extending flange 27 which constitutes in effect a base for the stem, and said flange is likewise provided with serrations or threads forming surfaces that interlock with the rubber of the air bag.

In the form shown in Figs. 2 and 4 the portion 21 of the stem, shoulder 23 and the member secured thereto are first molded into a mass of rubber, indicated at 28, and then this mass of rubber is molded into the rubber of the air bag 16. However, when the parts are fully united the rubber 28 and the rubber of the air bag will in effect constitute an integral rubber wall structure.

It will be seen that, as in the first described embodiment, the member secured to the portion 21 of the stem and the rubber bonded thereto are insulated from the stem by the rubber lying between the member and said portion of the stem in the same way as was the shell 17 and the rubber bonded thereto. In this last described form additional vulcanizing areas are provided, thus improving the bond between the rubber of the bag and the surfaces of the stem and member, with a resultant improvement in the life of the bag for the reasons set forth with respect to the first described form.

Although specific embodiments of the invention have been illustrated and described herein, it will be understood that the invention is susceptible of various modifications and adaptations within the scope of the appended claims.

Having thus described my invention, I claim:

1. A stem for an air bag of the character described, comprising a substantially tubular stem proper having a bore therethrough and provided with a portion adapted to be molded into the material of the air bag, and a member mounted on said stem and surrounding said portion thereof in spaced relation thereto, said member being of a length substantially coextensive with the length of said portion.

2. A stem for an air bag of the character described, comprising a substantially tubular stem proper having a bore extending therethrough and provided with a portion adapted to be molded into the material of the air bag, and a relatively thin metallic shell mounted on said stem and surrounding said portion thereof in spaced relation thereto, said shell being of a length substantially coextensive with the length of said portion.

3. A stem for an air bag of the character described, comprising a substantially tubular stem proper having a bore therethrough and provided with a portion adapted to be molded into the material of the bag, and a substantially hollow member surrounding said portion of the stem in spaced relation thereto and having one of its ends shaped to contact said stem and be secured thereto while its opposite end is provided with an outwardly extending flange, said member being of a length substantially coextensive with the length of said portion.

4. A valve stem for an air bag of the character described, comprising a stem proper having an enlarged portion adapted to be arranged exteriorly of the air bag and a reduced portion separated from said enlarged portion by a shoulder and adapted to be molded in the material of the air bag, and a hollow member surrounding said reduced portion in spaced relation and having one of its ends shaped to contact said shoulder and its opposite end provided with an outwardly extending flange, said member being substantially coextensive in length with the length of said reduced portion.

5. A stem for an air bag of the character described comprising a substantially tubular stem proper having a bore therethrough and provided with a portion adapted to be molded into the material of the air bag, and a member mounted on said stem and surrounding said portion thereof in spaced relation thereto, said member being coextensive in length with the major part of said portion.

JOHN C. CROWLEY.